Sept. 5, 1944.   L. C. CRITES   2,357,634
PRESSURE COOKER
Filed Feb. 25, 1942
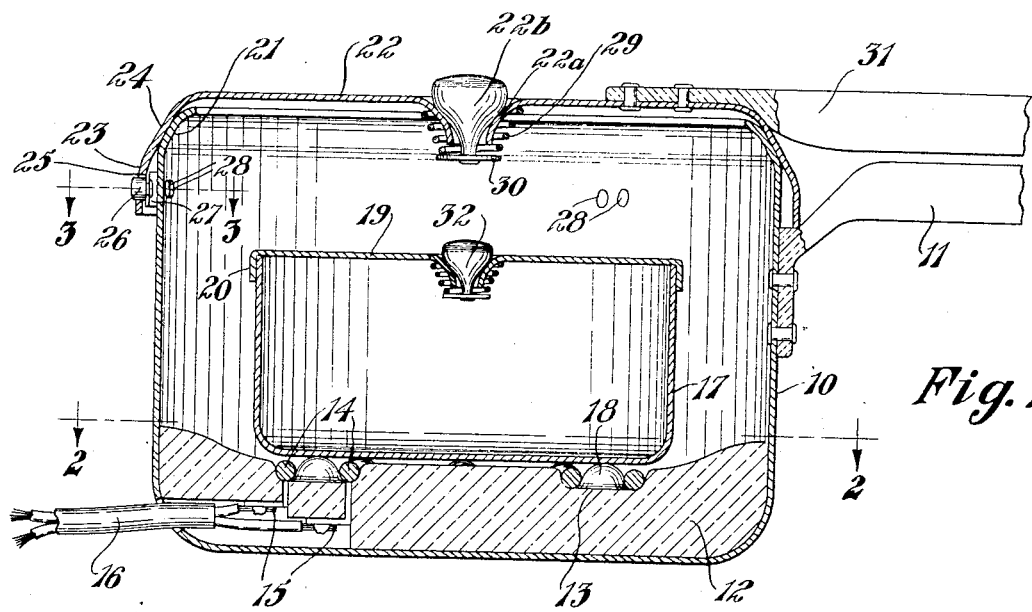
Fig. 1
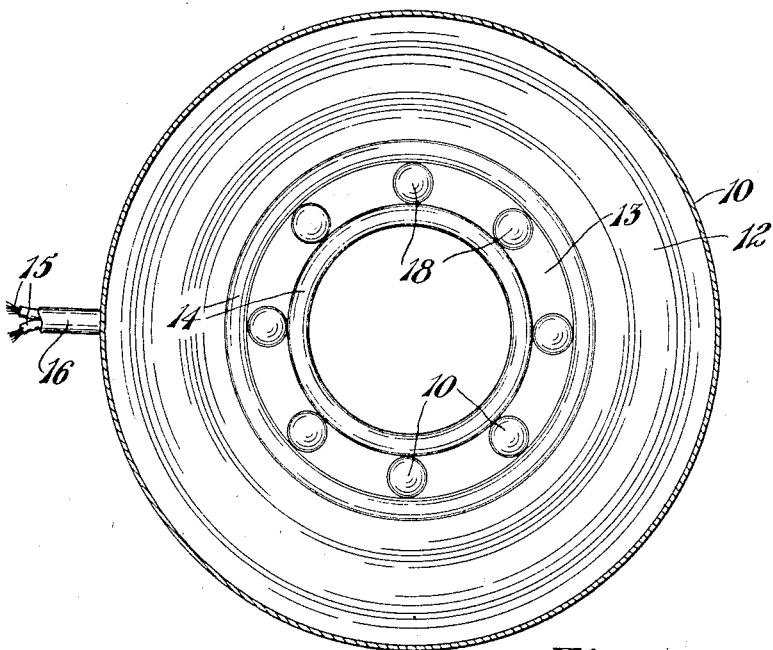
Fig. 2
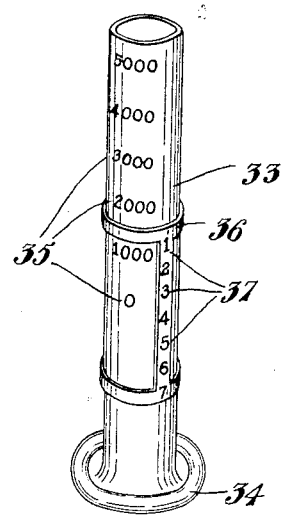
Fig. 5
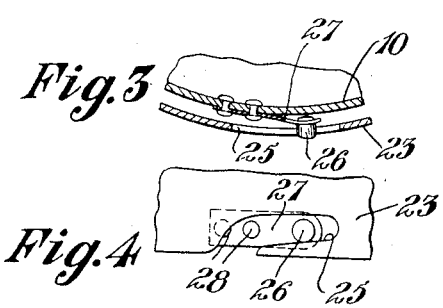
Fig. 3
Fig. 4
Inventor
Leo C. Crites
By Frease and Bishop
Attorneys Patented Sept. 5, 1944

2,357,634

UNITED STATES PATENT OFFICE 2,357,634

PRESSURE COOKER

Leo C. Crites, Wooster, Ohio

Application February 25, 1942, Serial No. 432,206

9 Claims. (Cl. 219—44)

The invention relates to electrically operated, steam pressure cookers and more particularly to a pressure cooker in which the water placed in the cooker for generating steam closes an electric circuit between two spaced electrodes within the cooker so that the period of time required for steam pressure cooking is controlled by the amount of water placed in the vessel.

It is an object of the invention to provide a steam pressure cooker comprising a pressure resisting outer shell or container having a removable, airtight lid and provided with a self-contained unit including electrical means for producing steam.

A further object is the provision of such a pressure cooker with an inner container for the food to be cooked and means for sealing the same so as to prevent steam or water from coming into contact with the food in the inner container.

A still further object is the provision of a pressure cooker of the character referred to in which the inner container is provided with a lid or cover for draining condensed water back to the steam generating unit of the outer container and preventing the water from coming into contact with the foods being cooked in the inner container.

Another object is the provision of a pressure cooker comprising an outer container or shell provided with a steam generating unit within its lower portion comprising an insulation base or block located in the bottom of the outer container and provided with a groove or trough within which are located spaced electrodes connected to opposite sides of an electric circuit, the trough being adapted to receive water which may contain ordinary table salt, or other chemical, to assist the electrical conductivity of the water between the spaced electrodes.

Still another object of the invention is the provision of a support or rack in the bottom of the outer container for supporting the inner container out of contact with the steam generating unit.

Another object is the provision of a pressure cooker of this character in which the outer shell is provided with a valve for controlling the steam pressure within said outer container and for releasing the pressure when it is desired to unlock and remove the sealing lid for the outer container.

A further object of the improvement is the provision of simple and easily operated latching means for sealing the lid upon the outer container.

A still further object is the provision of valve means upon the inner container to prevent internal steam pressure from exploding the inner container into the outer container.

Still another object of the invention is the provision of a novel measuring device for measuring the amount of water required to cook various foods at various altitudes.

The above objects together with others which will be apparent from the drawing and following description, or which may be later referred to, may be attained by constructing the improved pressure cooker in the manner illustrated in the accompanying drawing, in which—

Figure 1 is a vertical sectional view through a pressure cooker embodying the invention;

Fig. 2, a horizontal section through the pressure cooker taken as on the line 2—2, Fig. 1;

Fig. 3, a fragmentary sectional view of the improved latching means for sealing the lid upon the outer container, taken as on the line 3—3, Fig. 1;

Fig. 4, a fragmentary elevation of the improved latching means shown in Fig. 3, and Fig. 5, a perspective view of the measuring device for measuring the amount of water required to cook various foods at various altitudes.

Similar numerals refer to similar parts throughout the drawing.

The electrical steam pressure cooker to which the invention pertains includes an outer container or shell 10 preferably formed of metal of suitable thickness and strength to withstand the steam pressure generated therein. Any suitable form of handle as shown at 11 may be attached to the side of the container 10 in usual and well known manner to provide for easy handling of the device.

A self-contained electrical heating unit is provided in the bottom of the container 10 for producing steam pressure to perform the cooking of foods in the device as will be later described. This unit includes a block or base 12 of porcelain, or other suitable insulation material, fitted within the bottom of the container and having an annular groove, or trough, 13 formed in its upper surface, within which is located a spaced pair of electrodes in the form of concentric rings 14 which are connected by wires 15 to opposite sides of an electric circuit carried in a flexible cord 16 of usual and well known construction and adapted to be plugged into a receptacle in a circuit within the house as in usual and well known manner.

For the purpose of supporting an inner receptacle or container 17 out of contact with the electrodes 14 any suitable supporting means may be provided such for instance as the knobs or lugs 18 located at spaced intervals in the annular groove 13 between the electrodes 14 and extending sufficiently above the electrodes so that the inner container 17 will be supported spaced above the electrodes as best shown in Figure 1.

The inner container 17 is adapted to contain the food to be cooked in the device and is provided with a lid 19 which is preferably arranged to fit tightly upon the container 17 so as to seal the same and prevent steam or moisture from the outer container 10 from entering the inner container and coming into contact with the food therein. This lid is provided with a depending peripheral flange 20 fitting over the upper edge portion of the container 17 and arranged to drain condensation back into the outer container and prevent it from entering the inner container.

The upper open end of the outer container 10 is preferably inwardly tapered or beveled as at 21 and a lid 22 is provided for closing the outer container and has the peripheral flange 23, a portion of which is tapered or beveled as at 24 so as to be wedge fitted upon the corresponding portion 21 of the container.

Latching means is provided for tightly locking the lid 22 upon the outer container 10 so as to produce an airproof seal between the container and lid. This latching means preferably comprises a plurality of bayonet slots 25 formed in the peripheral flange 23 of the lid and adapted to be engaged by studs 26 which are preferably carried upon spring ears 27 attached to the side walls of the container 10 as by rivets 28.

For the purpose of relieving the steam pressure after it reaches a predetermined point, and for manually releasing the steam pressure in order to unlatch and remove the lid 22, a valve is provided in the lid.

In order to accommodate this valve the central portion of the lid 22 is provided with the depending, substantially conical valve seat 22a, within which is seated a correspondingly shaped valve 22b, which may be of sufficient weight to retain the desired steam pressure within the outer container 10, or which may be normally held in closed position as by the coil spring 29 which surrounds the valve seat 22a and engages a disc or shoulder 30 upon the lower end of the valve 22b, this spring having sufficient tension to retain the desired steam pressure. A handle 31 of any suitable character may be provided upon the lid 22 for removing and replacing the same.

In order to prevent internal pressure within the inner container 17 from building up sufficiently to explode the inner container a valve 32, similar to the valve 22b, may be provided in the lid 19 of the inner container.

In Figure 5 is shown a measuring device for measuring the desired quantity of water to be placed in the outer container for cooking various kinds of food at different elevations above sea level. Since the boiling point of water varies at different altitudes it will be obvious that the amount of water required for cooking any particular food will vary according to the elevation above sea level.

This measuring device comprises a stem, or post, 33 provided with a base 34 adapted to be supported upon the bottom of the outer container. This post is provided at spaced intervals with figures 35 indicating various elevations relative to sea level. A sleeve 36 is slidably mounted upon the post 33 and provided with a vertical series of figures 37 indicating different levels to which the container may be filled with water for cooking of different foods.

For any particular elevation the sleeve 36 is adjusted vertically upon the post 33, as for instance as shown in Figure 5, the sleeve 36 is set for an altitude of about 1500 feet above sea level and the sleeve remains in this position. As various foods require different lengths of time for cooking the water level in the container 10 will be varied according to the table of figures 37 which indicate the required water levels for various foods.

In operating the improved pressure cooker for the cooking of foods the lid 22 is removed from the outer container and the inner container 17 is removed. The measuring device shown in Figure 5 is placed in vertical position upon the bottom of the outer container and the desired amount of water is poured into the outer container. Since substantially pure water is a poor electrical conductor common table salt or other suitable chemical may be added to the water in order to increase the electrical conductivity of the water.

It will be seen that when the water is placed in the outer container and the annular groove 13 is filled with water the circuit will be closed through the water between the spaced electrodes 14.

The food to be cooked is placed in the inner container and the same is then placed upon the support or knobs 18 holding the same out of contact with the electrodes 14, this being for the purpose of preventing the circuit from passing from one electrode to the other through the container 17 after all of the water has boiled out of the groove 13.

The lid 22 is then placed upon the outer container and locked in position sealing the lid tightly upon the container and the electric cord 16 is plugged into a receptacle. The electric current passing through the water in the outer container, from one electrode 14 to the other will quickly heat the water forming steam within the outer container and this steam will heat the food in the inner container 17 indirectly if the lid 19 is placed upon the inner container and directly if the lid 19 is left off the inner container.

As the desired steam pressure is obtained the steam will be valved off through the valve 22b so that the necessary steam pressure may be maintained throughout the cooking. By adjustment of the spring 29, or weight of the valve 22b, the pressure at which the device will operate may be adjusted.

In the same manner it will be seen that if the steam pressure of the cooking food within the inner container 17 passes above the desired level this steam will be automatically valved off through the valve 32.

I claim:

1. A pressure cooker comprising a pressure resisting outer container, an inner food container within the outer container, means for producing steam pressure in the outer container, means for excluding pressure in the outer container from entering the inner container, and mechanical means controlling the vapor pressure in the inner container at a predetermined variable setting for allowing excess pressure in the inner container to escape into the outer container.

2. A pressure cooker comprising a pressure resisting outer container, an inner food container within the outer container, means for producing regulated steam pressure in the outer container, valve means in the outer container to control steam pressure, means for excluding pressure in the outer container from entering the inner container, and mechanical means controlling the vapor pressure in the inner container at a predetermined variable setting for allowing excess pressure in the inner container to escape into the outer container.

3. A pressure cooker comprising a pressure resisting outer container, an inner food container within the outer container, means for producing steam pressure in the outer container, means for excluding pressure in the outer container from entering the inner container, and valve means for allowing excess pressure in the inner container to escape into the outer container.

4. A pressure cooker comprising a pressure resisting outer container, a lid for the outer container, means for producing an airtight seal between the container and lid, a self-contained electrical unit within the outer container for producing steam therein, and an inner, food container within the outer container, a lid for the inner container forming an airtight seal therewith, a valve in the lid of the inner container and means for normally holding said valve closed for excluding pressure in the outer container from entering the inner contained and for permitting said valve to open at a predetermined steam pressure within the inner container to exhaust steam from the inner container into the outer container.

5. A pressure cooker comprising a pressure resisting outer container, a lid for the outer container, means for producing an airtight seal between the container and the lid, a self-contained electrical unit within the outer container for producing steam therein, said unit comprising an insulation block in the bottom of the outer container and having a groove in its upper surface, a spaced pair of electrodes in said groove, said electrodes located in opposite sides of an electric circuit so that when the groove is filled with water the circuit will be completed through the water from one electrode to the other, and an inner food container within the outer container, and a measuring device for measuring the amount of water to be placed in the outer container, said measuring device comprising a vertical post having graduations thereon indicating various elevations, and a sleeve slidably mounted upon the post and having graduations thereon indicating various liquid levels.

6. A double vessel comprising an outer vessel, an inner vessel within the outer vessel, valve means for producing steam pressure in the outer vessel, means for excluding steam pressure in the outer vessel from entering the inner vessel, and valve means for allowing excess pressure in the inner vessel to escape into the outer vessel.

7. A pressure cooker comprising an outer container, an inner container within the outer container, means for producing steam pressure in the inner container, valve means for allowing steam pressure in the inner container to escape into the outer container, and means for controlling steam pressure in the outer container.

8. A pressure cooker comprising an outer container, an inner container within the outer container, means for producing steam inside the outer container, means for controlling the vapor pressure in the inner container at a predetermined variable setting from entering the outer container, and means for allowing excess pressure in the outer container to escape out of the container.

9. A pressure cooker comprising an outer container, an inner container within the outer container, means for producing vapor pressure within the outer container, mechanical means for limiting the pressure in the outer container, and mechanical means connected to the inner container to control the pressure in the inner container at a predetermined variable setting and for allowing the excess pressure from the inner container to exhaust into the outer container.

LEO C. CRITES.